(12) United States Patent
Bechtler et al.

(10) Patent No.: US 6,672,208 B2
(45) Date of Patent: Jan. 6, 2004

(54) METHOD AND APPARATUS FOR USING MAGNETIC BEARINGS TO POSITION AN INKING UNIT ROLLER IN AT LEAST TWO DIFFERENT POSITIONS

(75) Inventors: Jochen Bechtler, Malsch (DE); Rolf Spilger, Viernheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 24 days.

(21) Appl. No.: 09/998,721

(22) Filed: Nov. 30, 2001

(65) Prior Publication Data

US 2002/0073866 A1 Jun. 20, 2002

(30) Foreign Application Priority Data

Nov. 30, 2000 (DE) .......................... 100 59 589

(51) Int. Cl.[7] .............................. B41F 31/30; B41F 31/00
(52) U.S. Cl. ........................ 101/351.1; 101/350.1; 101/352.01; 101/485; 101/DIG. 32; 310/90.5
(58) Field of Search ................... 370/90.5; 101/483, 101/352.07, 348, 350.3, 352.06, 351.1, 350.1, 485, 352.01, DIG. 32

(56) References Cited

U.S. PATENT DOCUMENTS 5,062,362 A * 11/1991 Kemp ........................ 101/348
5,084,643 A * 1/1992 Chen ........................ 310/90.5
5,093,754 A * 3/1992 Kawashima ................. 361/144
5,262,692 A * 11/1993 Williams et al. ........... 310/90.5
5,455,472 A * 10/1995 Weiss et al. ............... 310/90.5
5,530,306 A * 6/1996 Ueyama .................... 310/90.5
5,696,412 A * 12/1997 Iannello .................... 310/90.5
5,704,288 A    1/1998 John
6,404,088 B1 * 6/2002 Barada et al. ............. 310/90.5

FOREIGN PATENT DOCUMENTS

| DE | 104 259       | 3/1974  |
| DE | 195 21 827 A1 | 12/1996 |
| DE | 199 40 532 A1 | 4/2000  |
| DE | 199 03 847 A1 | 8/2000  |

* cited by examiner

Primary Examiner—Stephen R. Funk
Assistant Examiner—Leo T. Hinze
(74) Attorney, Agent, or Firm—Laurence A. Greenberg; Werner H. Stemer; Gregory L. Mayback

(57) ABSTRACT

A method and a corresponding inking unit permit positioning of a roller into at least two different operating positions. The roller is, in particular, a vibrator roller of an inking unit for a rotary printing machine. The roller is positioned by controlling or regulating a magnetic bearing device in which the roller is mounted.

19 Claims, 5 Drawing Sheets

METHOD AND APPARATUS FOR USING MAGNETIC BEARINGS TO POSITION AN INKING UNIT ROLLER IN AT LEAST TWO DIFFERENT POSITIONS

BACKGROUND OF THE INVENTION

Field of the Invention

The invention relates to a method of positioning a roller that can be moved into at least two different operating positions in a printing machine. In addition, the invention relates to an inking unit for a printing machine having a roller that can be moved into at least two different operating positions.

Printing machines, and in particular rotary printing machines, of the generic type are already known. In an inking unit, it is usual for ink to be transmitted from a ductor roller to a vibrating roller and by means of the latter then to an ink distributor roller. To this end, the ductor roller is operatively connected in a manner known per se to an ink supply container to form a defined ink film on the ductor roller. In order to achieve metered transfer of ink, the vibrator roller is brought into operative contact with the ductor roller using an oscillatory movement (for example a swinging movement). The vibrator roller is subsequently moved from this first operating position into a second operating position, forming an operative contact between the latter and an ink distributor roller for the renewed transfer of ink. Known rolling mechanisms in rotary printing machines normally comprise still further intermediate and ink applicator rollers, by means of which ink is transferred, directly or indirectly, to a plate cylinder in order to ink a printing image located on the latter. This inked printing image is finally transferred onto the printing material to be printed using a blanket cylinder that is in frictional contact with the plate cylinder.

In order to oscillate the vibrator roller between the first operating position (operative contact between the vibrator roller and the ductor roller) and the second operating position (operative contact between the vibrator roller and the ink distributor roller), either a mechanical coupling between the vibrator roller and a main drive of the rotary printing machine, or a separate drive (Published German Patent Application DE 199 40 532 A1) is provided. For this purpose, known drive systems have a tilting lever and a cam disk which, when operated, displaces the longitudinal axis of the vibrator roller in the direction of the ductor roller or the ink distributor roller. In this case, the cam disk can either be coupled to the main drive of the rotary printing machine or can be provided with a separate drive motor.

Disadvantageously, in known rotary printing machines, undesired oscillations occur in the inking unit. Undesired oscillations are produced by the vibrator roller, or by the so-called vibrator shock, when the vibrator roller is moved in an oscillatory fashion between the ductor roller and the ink distributor roller. Vibrator shock is understood to mean the acceleration of the vibrator roller to the circumferential speed of the rapidly rotating ink distributor roller and the braking the vibrator roller to the circumferential speed of the slowly rotating ductor roller, which acceleration or braking is effected by friction between the circumferential surfaces of the vibrator roller and the ink distributor or ductor roller. These rotational oscillations, which in principle should be avoided, are transmitted to the plate cylinder, and therefore, also to the ink printing image on the blanket cylinder, and also to the web to be printed. As a result, unsatisfactory printing results are obtained.

SUMMARY OF THE INVENTION

It is accordingly an object of the invention to provide a method for positioning a roller and an inking unit which overcome the above-mentioned disadvantages of the prior art apparatus and methods of this general type.

In particular it is an object of the invention to provide a method for positioning a roller and an inking unit of the type previously mentioned in which oscillations that can be attributed to the oscillatory movement of a roller can be eliminated or at least reduced in the corresponding printing machine.

With the foregoing and other objects in view there is provided, in accordance with the invention, a method of positioning a roller that can be moved into at least two different operating positions in a printing machine, that includes steps of: mounting the roller in a magnetic bearing device; and positioning the roller into one of the at least two different operating positions by performing an operation selected from the group consisting of controlling the magnetic bearing device and regulating the magnetic bearing device.

A magnetic bearing device of this type permits the implementation of controlled-movement and freely predefinable positioning of the roller into a respective operating position. For example, in the case of a vibrator roller in an inking unit of a rotary printing machine, the production of an operative contact between the vibrator roller and the ductor roller (first operating position) and also between the vibrator roller and the ink distributor roller (second operating position) can be carried out gently and in a controlled manner such that undesired oscillations in the inking unit brought about on account of the vibrator shock are eliminated or at least reduced. It is possible, in a relatively simple and reliable manner, to ensure that the vibrator roller is placed against the ductor roller and, respectively, against the ink distributor roller virtually without oscillating. Furthermore, as a result using the magnetic bearing device, it is possible to adapt the revolution rate of the vibrator roller with respect to the main drive, so that the revolution rate, the contact time, and the pressing force of the vibrator roller can be controlled or regulated when a contacting connection is made with the ductor roller or the ink distributor roller. The main operating parameters (pressing force, contact time and revolution rate) for producing an operative contact between the vibrator roller and the ductor roller or the ink distributor roller, respectively, can therefore be predefined flexibly and can be matched precisely to the operating conditions of the printing machine that are present in each case and may vary over the course of time.

In accordance with an added feature of the invention, the positioning of the roller is carried out by means of an oscillatory movement in accordance with a predefinable movement profile. On the basis of predefinable, different movement profiles, the oscillatory movement of the roller may be determined freely and temporarily variably. Furthermore, in the case of a vibrator roller, the number of vibrator cycles in the rotary printing machine can be defined variably. In this case, by means of a free predefinition of the movement profile, it is possible to achieve a gentle and therefore oscillation-free or reduced-oscillation placement of the vibrator roller against the ductor roller or, respectively, the ink distributor roller. The movement profile can, for example, be chosen in such a way that the roller is moved rectilinearly or along a curve (same path for back and forth movement) or else along a closed, for example circular or elliptical, path (different part-sections for back and forth movement) in order to position the same in a respective operating position.

In accordance with an additional feature of the invention, in order to assume an operating position, the roller comes into a contact connection with a further roller such that a specific roller pressing force is established during the production of the contacting connection. The roller pressing force is predefinable by means of controlling or regulating the magnetic bearing device. A controllable or regulatable magnetic bearing device is particularly suitable for reliable and matched pressing force regulation when producing a contacting connection between two rollers. In this case, one can use the fact that actively regulated magnetic bearings belonging to the magnetic bearing device are suitable for executing a radial movement of a rotating body (roller), and at the same time, permit the setting of a resultant deflection force. On the basis of these relationships, a controlled and flexibly predefinable oscillatory movement of the roller can be implemented in an operationally beneficial manner.

In accordance with another feature of the invention, it is preferable for the oscillatory movement of the roller to be carried out in the form of a displacement that is substantially parallel to the longitudinal axis of the roller. An oscillatory movement of a roller of this type may be implemented in a relatively simple, precise and reliable manner by means of the controllable or regulatable magnetic bearing device.

In accordance with a further feature of the invention, the magnetic bearing device has two magnetic bearings arranged spaced apart from each other, by means of which the roller can be adjusted obliquely by applying electric current differently to the magnetic bearings. In addition, the possibility of alternative or additional oblique adjustment of the roller can be used as a further adjustable degree of freedom to eliminate or at least reduce undesired oscillations when producing a contacting connection between the roller (for example a vibrator roller) and a further roller (for example a ductor roller or ink distributor roller).

In accordance with a further added feature of the invention, according to a preferred design variant, measured values from position sensors and/or from an electric current that is applied to the magnetic bearing device are used in order to carry out roller bearing regulation. With the aid of position sensors, the distance established in each case between the rotor (roller) and the stator of the magnetic bearing device can be measured continuously, if appropriate.

As an alternative to position sensors, the respective position of the rotor (roller) can also be registered by determining the electric current applied to or impressed on the magnetic bearing device, and therefore the position can be controlled. A specific position sensor should preferably be provided for each mechanical degree of freedom of the roller. Position regulation taking account of the respective measured values from the position sensors and/or the electric current impressed on the magnetic bearing device ensures the gentle and oscillation-free or reduced-oscillation placement of the roller against a further roller.

Because the distance between the rotor and the stator of the magnetic bearing device is measured by means of a position sensor while the vibrator roller is resting on one of the rollers adjacent to it, and the resulting distance measurement signal is linked by computation in an electronic control device with the current consumption of the magnetic bearing device corresponding to this time, the degree of wear of the circumferential surface of the vibrator roller, of which the diameter decreases as a result of abrasive wear, can be monitored. The current consumption of the magnetic bearing device, which is proportional to the decrease in the diameter of the vibrator roller as a result of abrasive wear, therefore functions in measurement terms as a wear indicator. Of course, this presupposes that the position of that roller, for example the ductor roller, on which the vibrator roller rests during the measurement, and the distance of the position sensor from just this roller (ductor roller) are known.

In accordance with a further additional feature of the invention, the positioned roller can be a vibrator roller of an inking unit for a rotary printing machine, and the further roller can be a ductor roller or an ink distributor roller.

With the foregoing and other objects in view there is provided, in accordance with the invention, an inking unit for a printing machine that includes: a roller that can be moved into at least two different operating positions; and a magnetic bearing device mounting the roller. The magnetic bearing device is for positioning the roller into any of the operating positions. The magnetic bearing device is controlled or regulated in order to position the roller in a respective operating position.

In accordance with an added feature of the invention, the magnetic bearing device has two magnetic bearings, which are arranged spaced apart from each other and which can each be controlled or regulated independently. First, this ensures that the roller (vibrator roller) is reliably mounted, while at the same time ensures that the roller is precisely positioned, and if appropriate, enables the roller to be obliquely set.

In accordance with an additional feature of the invention, the magnetic bearings are advantageously operatively connected to an associated end of the roller. In this way, given an appropriate configuration of the ends of the roller, the formation of a relatively compact, symmetrically arranged magnetic bearing device, which is relatively easily accessible from the outside is made possible. In this case, the end of the roller can be formed, for example, as a reduced-cross-section journal, which is accommodated in an annular stator belonging to the associated magnetic bearing, forming a magnetic mounting.

In accordance with another feature of the invention, the magnetic bearing device is advantageously operatively connected to a control unit for regulating the position of the roller. By means of a suitable control unit, it is possible, in an operationally beneficial manner, to predefine a desired movement profile of the roller (vibrator roller) and to ensure correct positioning of the roller.

In accordance with a further feature of the invention, the control unit advantageously has at least one current sensor and/or at least one position sensor to regulate the position of the roller. In this case, the position sensors and the current sensors can be arranged to be integrated into the magnetic bearing device in a relatively compact manner and can be operatively connected to the control unit for the purpose of preferably continuous data transmission.

In accordance with a concomitant feature of the invention, the control unit has a specific position sensor for each mechanical degree of freedom of the roller. Since using a magnetic bearing device advantageously leads to a higher number of mechanical degrees of freedom of the roller (vibrator roller) as compared with the solutions from the prior art, a corresponding number of position sensors specific to the degrees of freedom should be provided in order to ensure correct and controlled positioning of the roller. Other features which are considered as characteristic for the invention are set forth in the appended claims.

Although the invention is illustrated and described herein as embodied in method of positioning a roller, which can be moved into at least two different operating positions in a printing machine, and corresponding inking unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
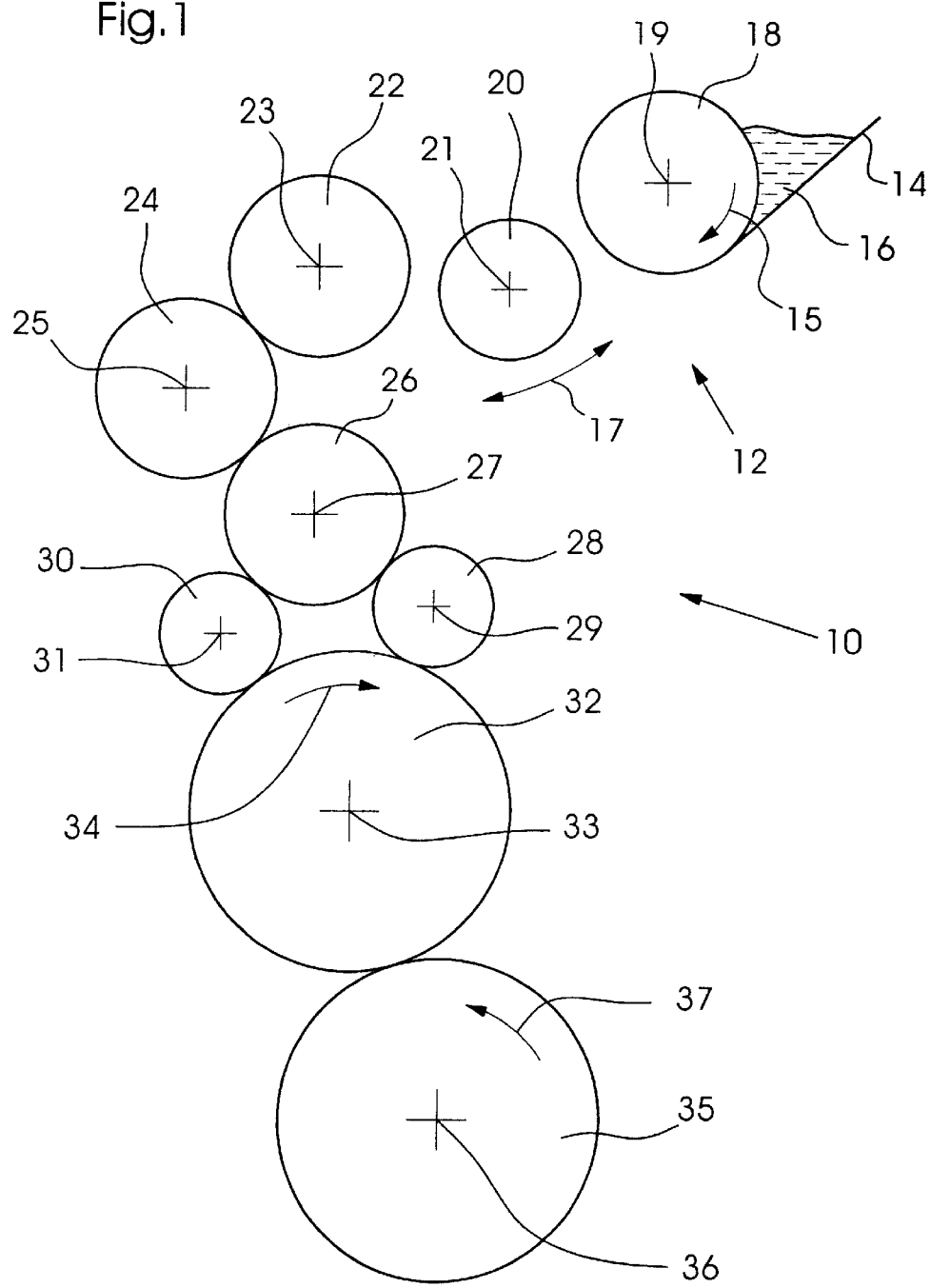
FIG. 1 schematically shows a side view of an inking unit for a rotary printing machine.

Referring now to the figures of the drawing in detail and first, particularly, to FIG. 1 thereof, there is shown a schematic side view of a rotary printing machine, designated generally by 10, having an inking unit 12. From an ink supply container 14, ink 16 is applied to a ductor roller 18 in the form of a defined ink film. It is possible for the ductor roller 18 to rotate about an axis of rotation 19 in accordance with arrow 15. A vibrator roller 20, which can be rotated about an axis of rotation 21, can be brought into operative contact with the ductor roller 18 or with an ink distributor roller 22 using an oscillatory movement represented by the double arrow 17. This oscillatory movement can be, for example, a pivoting or swinging movement. In a first operating position of the vibrator roller 20, the vibrator roller 20 is in a contacting connection with the ductor roller 18, which picks up ink 16 from the ink supply container 14 and transfers it to the vibrator roller 20. In a second operating position, the vibrator roller 20 is in operative contact with the ink distributor roller 22 for transferring ink to the ink distributor roller 22. In order to transfer ink from the ductor roller 18 by means of the vibrator roller 20 to the ink distributor roller 22, a respective oscillatory movement of the vibrator roller 20 from the first operating position into the second operating position and back again into the first operating position is carried out. The ink distributor roller 22 is in continuous frictional contact with further intermediate rollers 24, 26, which can be rotated about associated axes of rotation 25, 27, so that the transferred ink 16 in the inking unit 12 is transported onward. The ink 16 passes in finely distributed form onto ink applicator rollers 28, 30, which can be rotated about associated axes of rotation 29, 31 and serve to ink a printing image which is located on a plate cylinder 32. The plate cylinder 32 can be rotated about an axis of rotation 33 in accordance with arrow 34. By means of a blanket cylinder 35, which can be rotated about the axis of rotation 36 in accordance with arrow 37, the printing image transferred from the plate cylinder 32 is applied to a printing web (not shown here).

The necessary elements of the rotary printing machine 10 are indicated only schematically here, because of their great variety of form, and can be supplemented or varied in a known way. For example, a dampening unit in the area of the plate cylinder 32 can apply a dampening film. The subject of the invention relates in particular to the vibrator roller 20 that is moved between the ductor roller 18 and the ink distributor roller 22, and respectively, into the corresponding operating positions.

Figure 2:
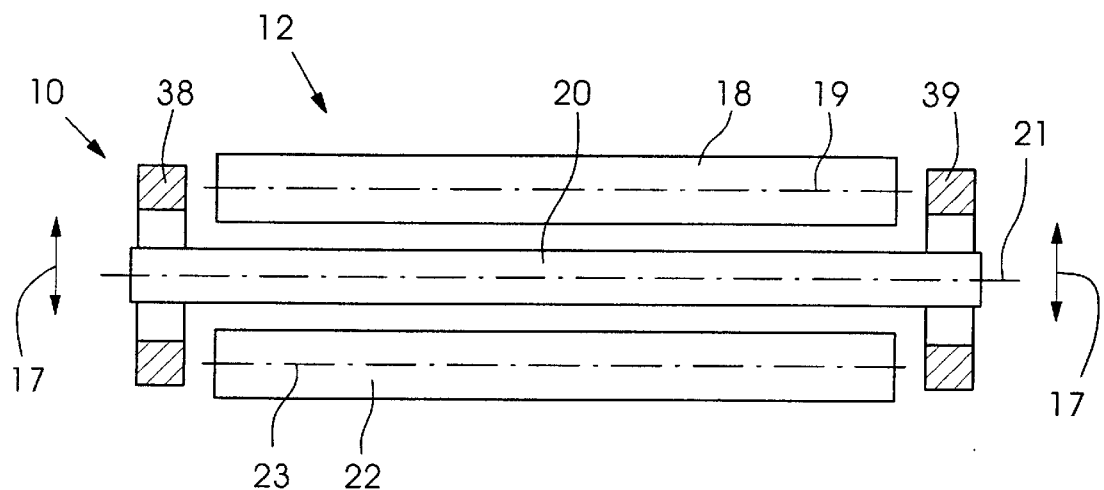
FIG. 2 shows a partial plan view of the inking unit in the area of a vibrator roller.

FIG. 2 shows a schematic plan view of a portion of the inking unit 12. The vibrator roller 20 can be rotated about the axis of rotation 21, and in accordance with the double arrow 17, can be displaced between the ductor roller 18 and the ink distributor roller 22 in two opposite directions. According to the invention, the vibrator roller 20 is mounted, preferably at the ends, by means of a magnetic bearing device including two magnetic bearings 38, 39. In order to position the vibrator roller 20, the two magnetic bearings 38, 39 can be controlled or regulated, using a control unit not shown in FIG. 2, into a desired operating position in accordance with double arrow 17. The vibrator roller 20 is therefore seated on both sides in the two magnetic bearings 38, 39, the latter, in addition to mounting the vibrator roller 20, also serves as an actively regulated drive unit for providing a desired radial movement of the vibrator roller 20 in accordance with double arrow 17.

Figure 3:
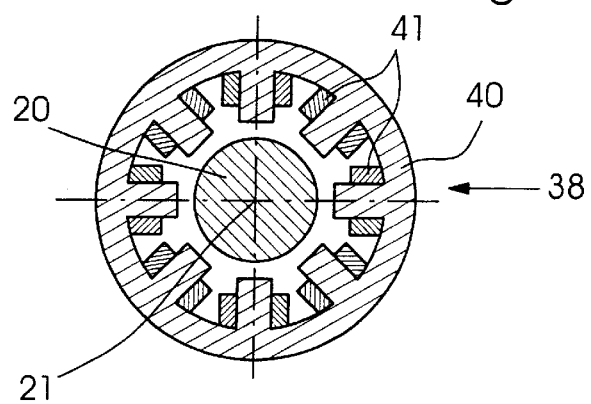
FIG. 3 shows an enlarged view of a cross section through a magnetic bearing of the vibrator roller shown in FIG. 2.

FIG. 3 shows a sectional view of the vibrator roller 20 in the area of the magnetic bearing 38, perpendicular to the axis of rotation 21 of the vibrator roller 20. The magnetic bearing 38 has an annular stator 40, in the interior of which annular coils 41 are arranged. If electric current flows through the annular coils 41, a displacement force is generated in a manner known per se on the rotor—or, respectively, on the operatively connected vibrator roller 20. A displacement force of this type causes a radial relative movement of the vibrator roller 20 toward the annular stator 40 and, according to the invention, is used for positioning the vibrator roller 20 into a desired operating position (operative contact with the ductor roller 18 or with the ink distributor roller 22).

By means of a sensor system not illustrated in FIG. 3, precise determination of the position of the vibrator roller 20 in the magnetic bearing device is made possible. In this case, the configuration and arrangement of suitable position sensors are known per se and will therefore not be explained specifically at this point. By means of an open-loop or closed-loop control unit, not illustrated here for reasons of clarity, for the magnetic bearing device, the individual annular coils 41 can be energized electrically in any desired way and with any desired intensity, and therefore the displacement force on the vibrator roller 20 can be influenced. In principle, by making appropriate changes to the electric current, any desired oscillatory movements can be implemented, for example, in the form of a pivoting movement or a swinging movement of the vibrator roller 20. Using a predefined movement profile, which can be stored in the open-loop or closed-loop control unit in the form of a digitized algorithm, the oscillatory movements of the vibrator roller 20 can be predefined and changed as desired.

Figure 4:
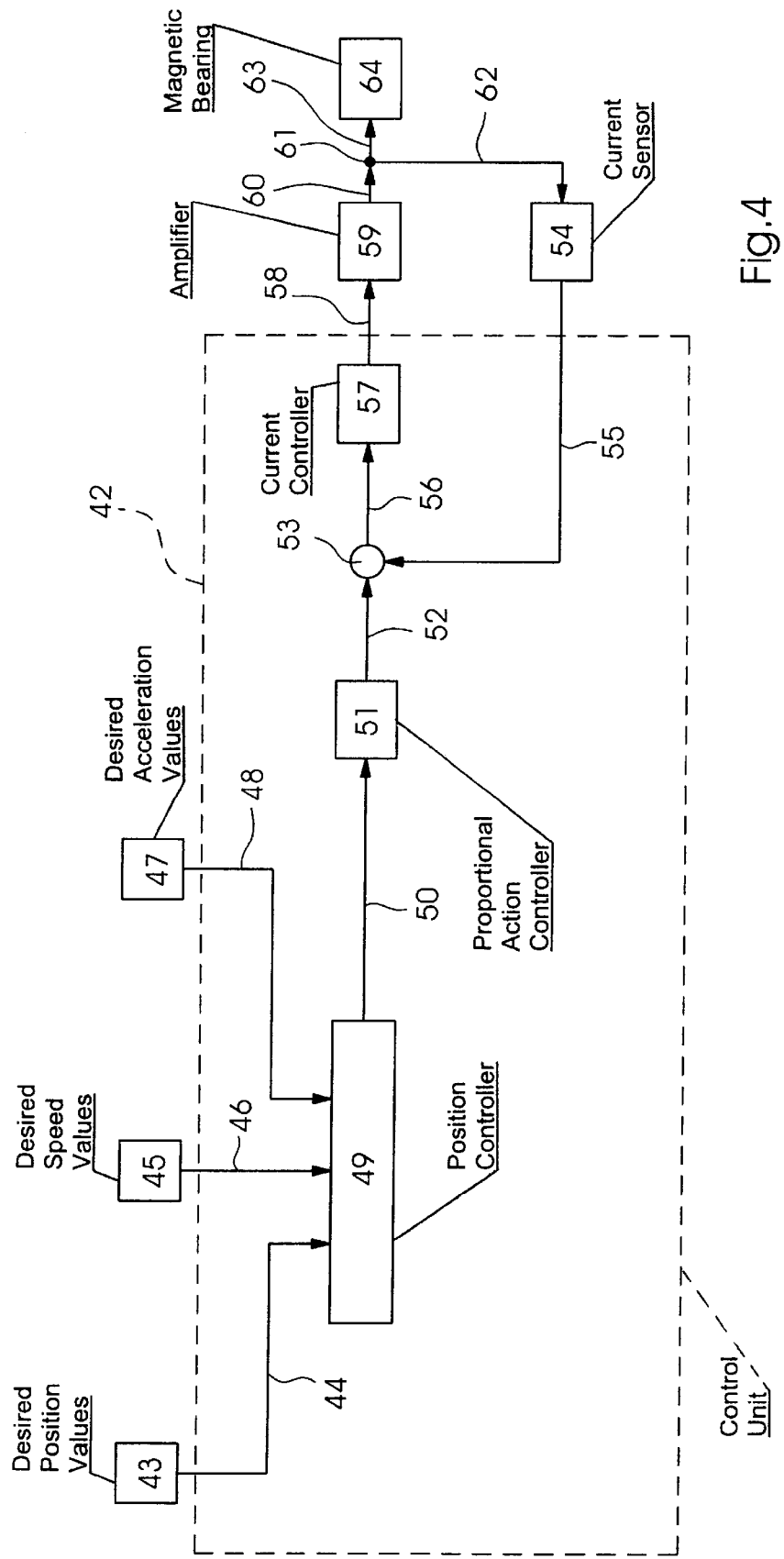
FIG. 4 shows a block diagram relating to regulating an oscillatory movement of the vibrator roller.

FIG. 4 shows a block diagram of one possibility of regulating the oscillatory movement of the vibrator roller 20.

In a control unit 42, desired position values 43 are transmitted by means of a transmission line 44, desired speed values 45 are transmitted by means of a transmission line 46, and desired acceleration values 47 are transmitted by means of a transmission line 48 to a position controller 49. The position controller 49 is operatively connected by means of a transmission line 50 to a proportional action controller 51, by means of which a force value is converted into a current value. The proportional action controller 51 is operatively connected by means of a transmission line 52 to a linking point 53, from which a transmission line 56 leads to a current controller 57. The current controller 57 is operatively connected by means of a transmission line 58 to a power amplifier 59, which, in turn, is operatively connected by means of a transmission line 60, a junction 61, and a transmission line 63 to a magnetic bearing 64. A transmission line 62 leads from the junction 61 to a current sensor 54. The current sensor 54 is operatively connected to the linking point 53 by a transmission line 55. The transmission line 62, the current sensor 54, and the transmission line 55 form a feedback path from the junction 61 to the linking point 53.

Therefore, the coils of the magnetic bearing 64 are energized electrically by means of the power amplifier 59. The electric current in the magnetic bearing 64 is capable of being regulated to a predefined operating value by means of the current sensor 54.

Figure 5:
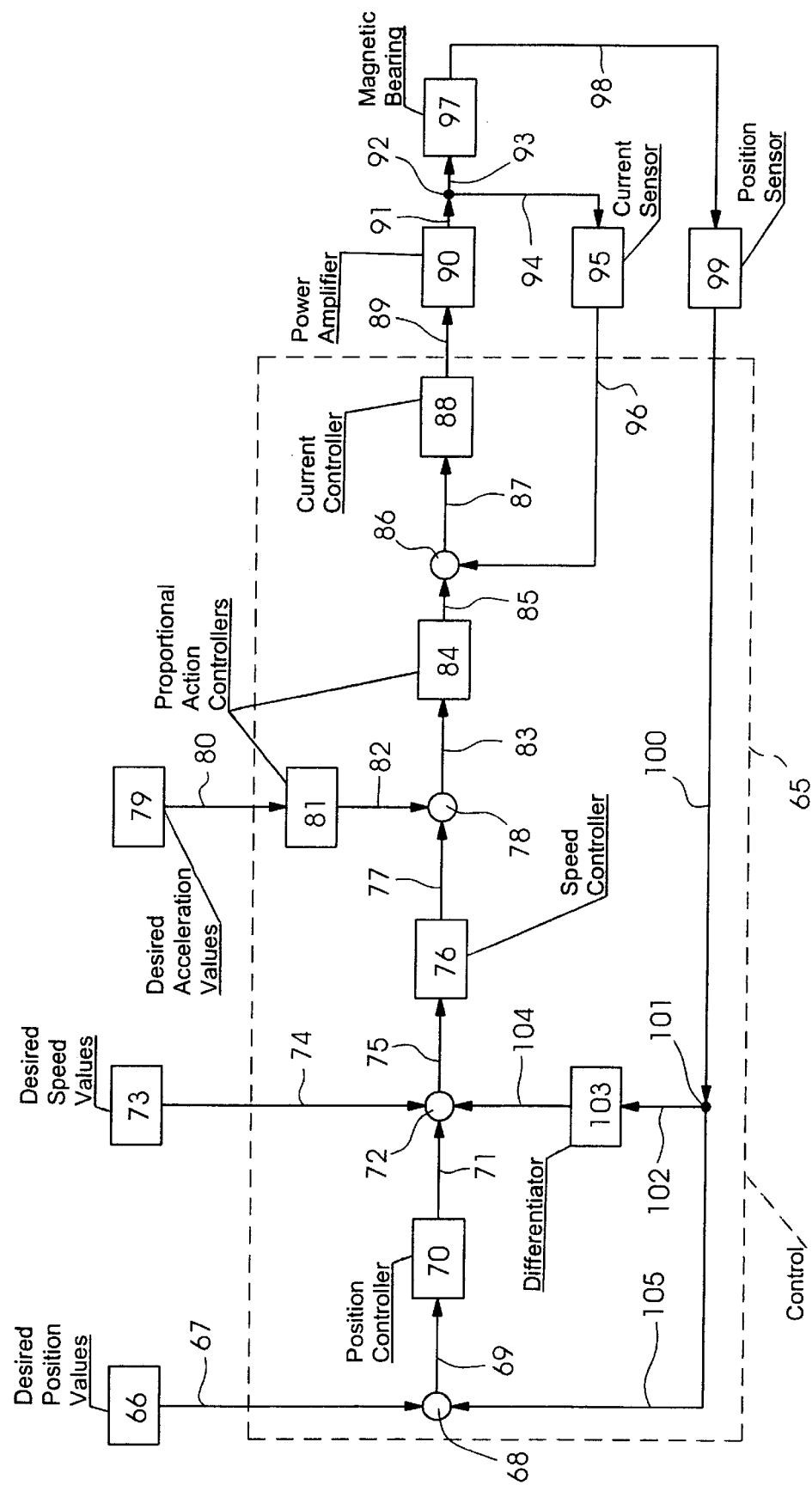
FIG. 5 shows an alternative block diagram relating to regulating an oscillatory movement of the vibrator roller.

As an alternative to the control unit 42 shown in FIG. 4, a control unit 65 shown in FIG. 5 can be provided to regulate the position of the vibrator roller. A desired position value 66 is transmitted by means of a transmission line 67 to a linking point 68 and from the latter by means of a transmission line 69 to a position controller 70. The position controller 70 is operatively connected by means of a connection line 71 to a linking point 72, to which a desired speed value 73 is also applied by means of a transmission line 74. From the linking point 72, a transmission line 75 leads to a speed controller 76, which is operatively connected by means of a transmission line 77 to a linking point 78. A desired acceleration value 79 is transmitted by means of a transmission line 80 to a proportional action controller 81, by means of which acceleration values are converted to force values. The proportional action controller 81 is operatively connected by means of a transmission line 82 to the linking point 78. From the linking point 78, a transmission line 83 leads to a proportional action controller 84, by means of which force values are converted to current values. The proportional action controller 84 is operatively connected by means of a transmission line 85 to a linking point 86, from which a transmission line 87 leads to a current controller 88. The current controller 88 is operatively connected by means of a transmission line 89 to a power amplifier 90. The power amplifier 90 is operatively connected by means of a transmission line 91, a branch 92 and a transmission line 93 to a magnetic bearing 97. From the branch 92, a feedback path in the form of a transmission line 94, a current sensor 95 and a transmission line 96 lead back to the linking point 86. The magnetic bearing 97 is operatively connected by means of a transmission line 98 to a position sensor 99, from which, in order to transmit an actual position value of the vibrator roller, a transmission line 100 leads to a junction 101. The junction 101 is operatively connected by means of a transmission line 105 to the linking point 68 and by means of a transmission line 102 to a differentiator 103. A transmission line 104 leads from the differentiator 103 to the linking point 72.

The desired movement profile is therefore also set up, according to FIG. 5, by predefining the desired position, speed and acceleration values 66, 73, 79. The desired position value 66 is compared at a linking point 68 with a corresponding actual position value (from transmission line 105), which has been determined by means of the position sensor 99. The result of this desired/actual comparison with regard to the position value is transmitted to the position controller 70, which is operatively connected to the linking point 72. At the linking point 72, desired speed values 73 are compared with actual speed values (from transmission line 104), which are supplied by the differentiator 103. The input of the differentiator 103 is operatively connected to the position sensor 99 and obtains the measured actual position values from the position sensor 99. The result of this desired/actual comparison is transmitted to the speed controller 76, which is in turn operatively connected to the linking point 78. The desired acceleration values 79 are transmitted to the proportional action controller 81, by means of which, by using a proportionality factor, the desired acceleration values 79 are transformed into desired force values. These desired force values are transmitted by the proportional action controller 81 to the linking point 78, which is operatively connected to the proportional action controller 84. The proportional action controller 84 is used to convert the respective force value into a corresponding current value, using a suitable proportionality factor. The current value is transmitted by the proportional action controller 84 to the linking point 86, which, together with the current controller 88, the power amplifier 90 and the current sensor 95, forms a control loop. The magnetic bearing 97 has an input that is operatively connected to this control loop and has an output that is operatively connected to the position sensor 99. The desired values 66, 73 are therefore compared with actual values, which have been determined by means of the position sensor 99. The coils of the magnetic bearing 97 are energized electrically using the power amplifier 90. The electric current can be regulated to the predefined value using the current sensor 95. Following appropriate driving of the magnetic bearing 97, the new position of the vibrator roller can be registered via the position sensor 99, and if necessary, can be readjusted. A dedicated open-loop or closed-loop control unit, including a power amplifier, should preferably be provided for each magnetic bearing 39.

The block diagram according to FIG. 5 is therefore a position control loop with position feedback, while the block diagram according to FIG. 4 is a position controller without position feedback. By means of the regulation indicated (or, if appropriate, by means of suitable control), any desired movement profile can be predefined in order to position the vibrator roller 20. For example, if the vibrator roller 20 (see also FIG. 2) is to be moved in the direction of the ink distributor roller 22, then this can be carried out by a displacement substantially parallel to the axis of rotation 21 of the vibrator roller 20, within the corresponding magnetic bearing 38, 39. The vibrator roller 20 is then no longer arranged centrally in the magnetic bearings 38, 39 according to FIG. 2, but is offset parallel to the same. If necessary, the vibrator roller 20 can also be obliquely displaced by means of a rotational movement about one or more points of rotation, by driving the magnetic bearings 38, 39 differently. As a result, the vibrator roller 20 can also assume a freely definable oblique position, so that completely novel possible arrangements of the vibrator roller 20 in the inking unit 12 can be implemented.

Furthermore, the movement profile can be defined in such a way that different and variable vibrator cycles of the vibrator roller 20 per machine revolution can be implemented. If, for example, the circumferential speed of the plate cylinder 32, and therefore also that of the ink distributor roller 22, is increased, then these changed conditions can be taken into account by increasing the vibrator cycle rate. By this means, tearing of the ink film in the inking unit 12 can be avoided.

The pressing force of the vibrator roller 20 against the ductor roller 18 and/or against the ink distributor roller 22 may advantageously be controlled or regulated. Depending on the properties of the ink 16 (for example its viscosity) or else the condition of the surface structures on the rolls 18, 20, 22, the pressing force can be increased or reduced in a flexible and controlled manner. This leads to a significantly more uniform transfer of ink. In order to reduce the force which is needed in order to pull the vibrator roller 20 off the ductor roller 18 and/or the ink distributor roller 22, the vibrator roller 20 can be pulled off obliquely.

In order to avoid or at least reduce undesirable vibrator shock, position regulation of the vibrator roller 20 is provided, by means of which it is ensured that the vibrator roller 20 is placed against the ductor roller 18 or against the ink distributor roller 22 at a definable speed and at a predefinable contact pressure. As a result of placing the vibrator roller 20 gently against the ductor roller 18 and against the ink distributor roller 22, respectively, an advantageous reduction in the maximum torque shock that occurs is achieved. The rotational momentum, which has to be transmitted when a contacting connection is produced, in order to accelerate the vibrator roller 20, remains the same.

Figure 6:
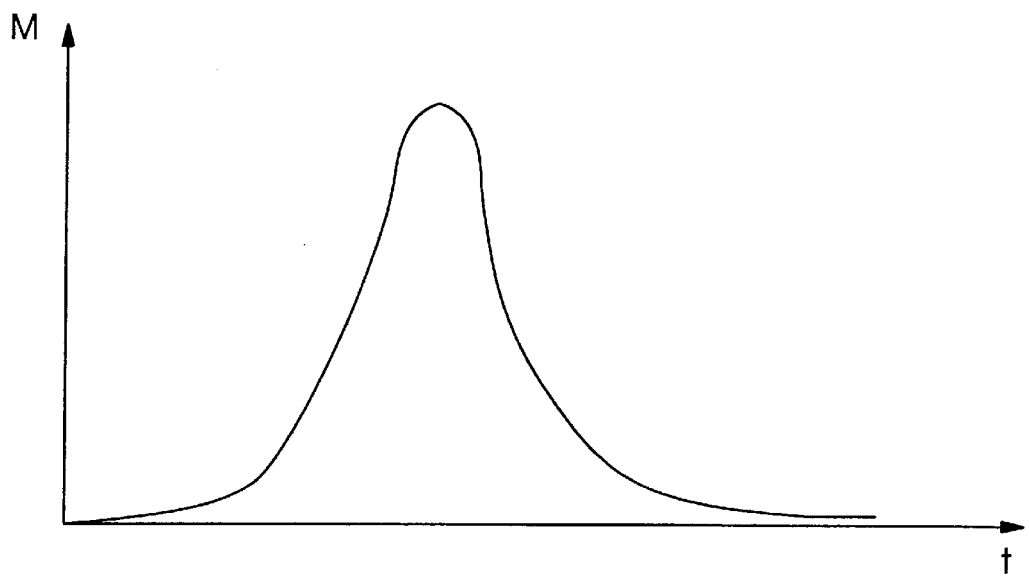
FIG. 6 shows a graph illustrating the time-dependent torque that is established in an inking unit without a magnetic bearing.
Figure 7:
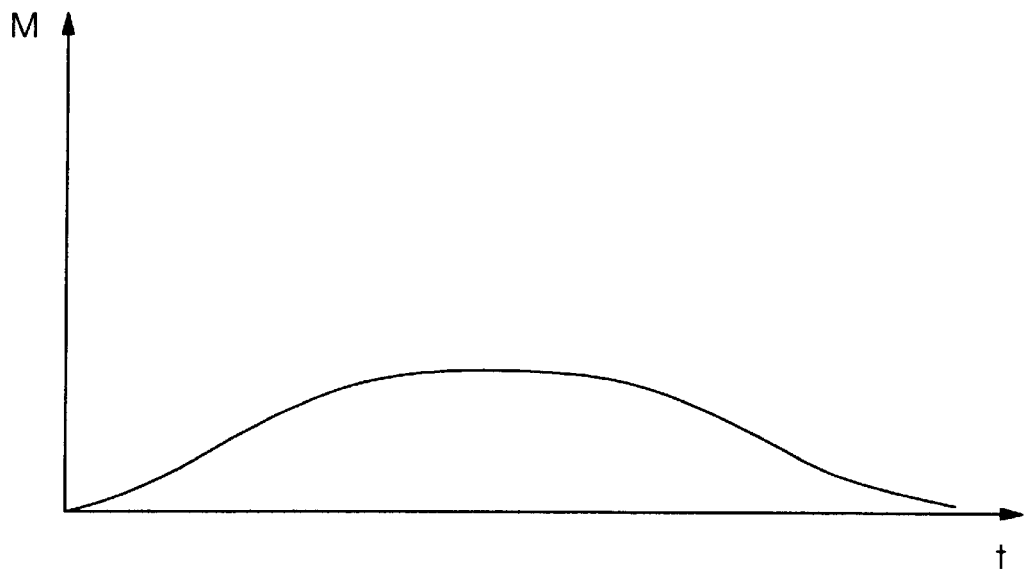
FIG. 7 shows a graph of the time-dependent torque that is established in an inking unit with a magnetic bearing.

The resulting reduction in the torque shock emerges from the graphs shown in FIGS. 6 and 7. FIG. 6 shows the torque, which is established as a function of time in the case of an inking unit without a magnetic bearing (prior art). It is possible to see the development of an undesirably high torque shock, which is the reason for rotational oscillations in the inking unit, which in principle are to be avoided.

FIG. 7, on the other hand, is a graph showing the formation of the torque as a function of time in an inking unit with a magnetic bearing. FIG. 7 shows that by integrating a magnetic bearing for mounting a vibrator roller in an inking unit, the risk of the undesired formation of rotational oscillations is reduced considerably as compared with a known embodiment according to FIG. 6.

The use according to the invention of a magnetic bearing device is not restricted to a vibrator roller for a rotary printing machine, but can advantageously also be provided in the case of other rollers whose positions are to be moved in a printing machine. In this case, the constructional configuration of a magnetic bearing is already known per se.

We claim:

1. A method of positioning a roller that can be moved into at least two different operating positions, which comprises:
   mounting the roller in a magnetic bearing device of a printing machine;
   positioning the roller into one of the at least two different operating positions by controlling the magnetic bearing device; and
   performing the positioning step using an oscillatory movement corresponding to a predefinable movement profile.

2. The method according to claim 1, which comprises:
   in order to assume the one of the at least two different operating positions, performing the positioning step such that the roller and a further roller establish a contacting connection in which a predefined specific roller pressing force is obtained while the contacting connection is being established.

3. The method according to claim 1, which comprises:
   performing the positioning step using an oscillatory movement having a displacement substantially parallel to a longitudinal axis of the roller.

4. The method according to claim 1, which comprises:
   providing the magnetic bearing device with two magnetic bearings that are configured spaced apart from each other; and performing the positioning step by applying different electric currents to the magnetic bearings such that the roller is adjusted obliquely.

5. The method according to claim 1, which comprises:
   performing the positioning step by regulating the magnetic bearing device using measured values; and obtaining the measured values by performing a process selected from the group consisting of measuring a position of the roller using position sensors and measuring at least one electric current that is applied to the magnetic bearing device.

6. The method according to claim 1, which comprises:
   providing the roller as a vibrator roller of an inking unit for a rotary printing machine;
   providing a further roller as a roller selected from the group consisting of a ductor roller and an ink distributor roller; and
   in order to assume the one of the at least two different operating positions, performing the positioning step such that the roller and the further roller establish a contacting connection.

7. The method according to claim 1, wherein the controlling of the magnetic bearing device is performed by an open-loop control.

8. The method according to claim 1, wherein the controlling of the magnetic bearing device is performed by a closed-loop control.

9. An inking unit for a printing machine, comprising:
   an inking-unit roller that can be moved into at least two different operating positions;
   a magnetic bearing device mounting said roller;
   said magnetic bearing device for positioning said inking-unit roller into any of said operating positions by controlling said operating positions; and
   a control unit operatively connected to said magnetic bearing device, said control unit having at least one current sensor for controlling the position of said inking-unit roller.

10. The inking unit according to claim 9, wherein:
   said magnetic bearing device includes two magnetic bearings that are configured spaced apart from each other; and
   said two magnetic bearings are acted upon in a manner selected from the group consisting of being independently controlled and being independently regulated.

11. The inking unit according to claim 10, wherein:
   said inking-unit roller has two ends; and
   each one of said two magnetic bearings are operatively connected to one of said two ends of said inking-unit roller.

12. The inking unit according to claim 9, wherein:
   said control unit has a specific position sensor for each mechanical degree of freedom of said inking-unit roller.

13. The inking unit according to claim 9, wherein:
   said inking-unit roller is a vibrator roller that has a diameter;

said magnetic bearing device consumes a current that is proportional to said diameter of said vibrator roller; and said current serves as a wear indicator of said vibrator roller.

14. The inking unit according to claim 9, wherein:

said inking-unit roller and said magnetic bearing device form part of a printing machine.

15. The inking unit according to claim 9, wherein said controlling is performed by an open-loop control.

16. The inking unit according to claim 9, wherein said performed by a closed-loop control.

17. A printing machine, comprising:

an inking unit including:
   an inking-unit roller that can be moved into at least two different operating positions;
   a magnetic bearing device mounting said roller;
   said magnetic bearing device for positioning said inking-unit roller into any of said operating positions by controlling said operating position; and
   a control unit operatively connected to said magnetic bearing device, said control unit having at least one current sensor for controlling the position of said inking-unit roller.

18. A method of positioning a roller that can be moved into at least two different operating positions, which comprises:

providing the roller as a vibrator roller of an inking unit for a rotary printing machine, mounting the vibrator roller in a magnetic bearing device of the printing machine;

positioning the vibrator roller into one of the at least two different operating positions by controlling the magnetic bearing device;

providing a further roller as a roller selected from the group consisting of a ductor roller and an ink distributor roller; and performing the Positioning step to establish a contacting connection between the roller and the further roller to assume the one of the at least two different operating positions.

19. An inking unit for a printing machine, comprising:

a vibrator roller having a diameter and a circumferential surface, said vibrator roller to be moved into at least two different operating positions; and a magnetic bearing device mounting said vibrator roller for positioning said vibrator roller into any of said operating positions by controlling said operating positions, and said magnetic bearing device consuming a current proportional to said diameter of said vibrator roller and serving as a wear indicator of said vibrator roller, using a degree of wear for measuring wear of said circumferential surface of said vibrator roller.

\* \* \* \* \*